July 29, 1958 L. E. DILTS ET AL 2,845,200
WIRE FEEDING APPARATUS
Filed Sept. 10, 1956 2 Sheets-Sheet 1
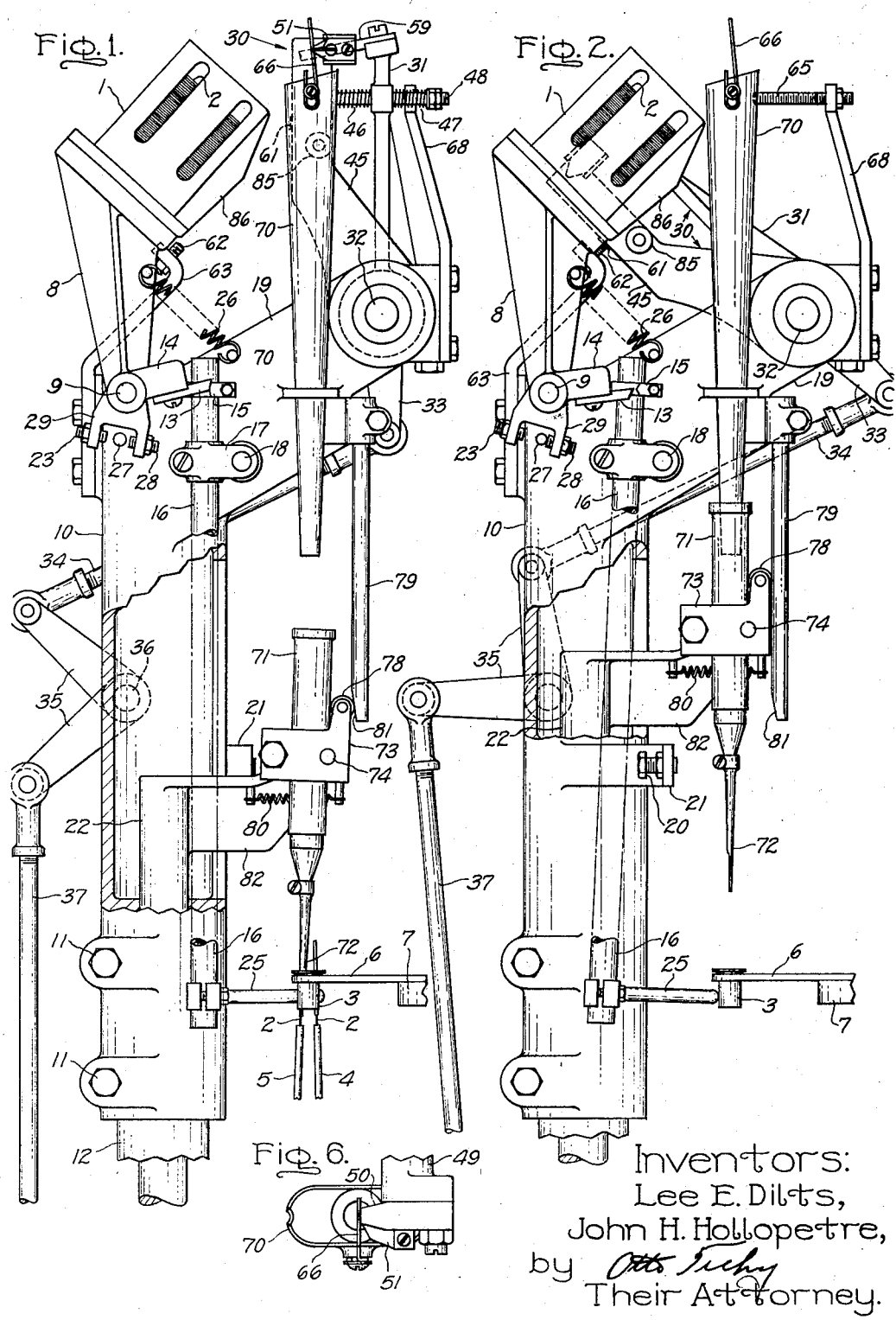
Inventors:
Lee E. Dilts,
John H. Hollopetre,
by Otto Tuchy
Their Attorney.

July 29, 1958    L. E. DILTS ET AL    2,845,200
WIRE FEEDING APPARATUS
Filed Sept. 10, 1956    2 Sheets-Sheet 2
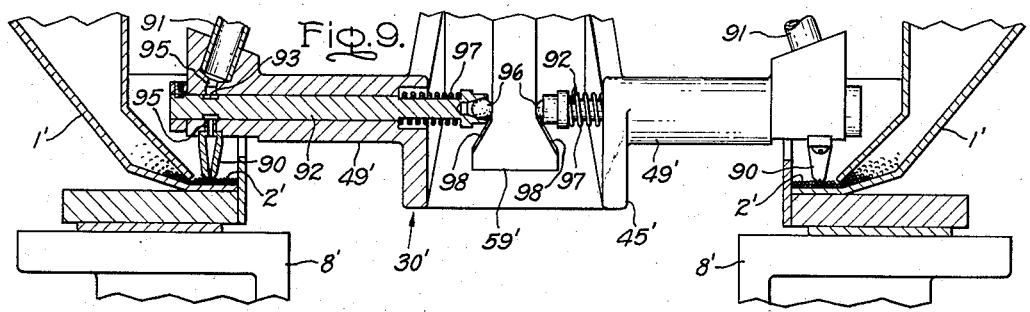
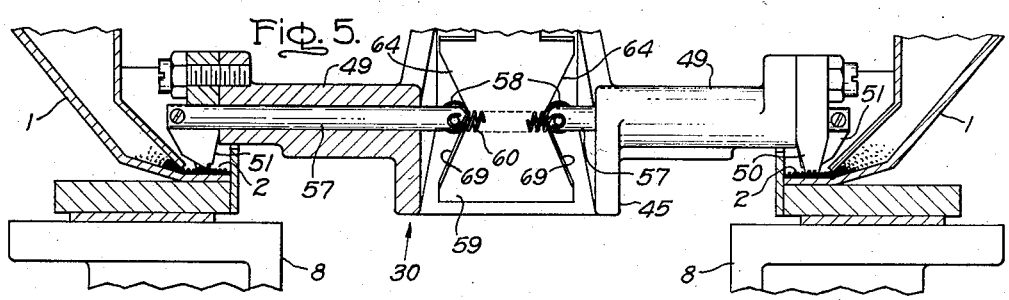
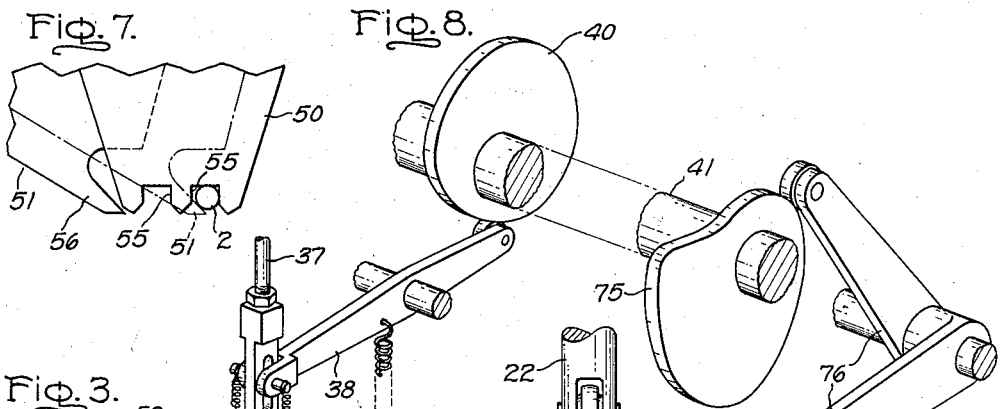
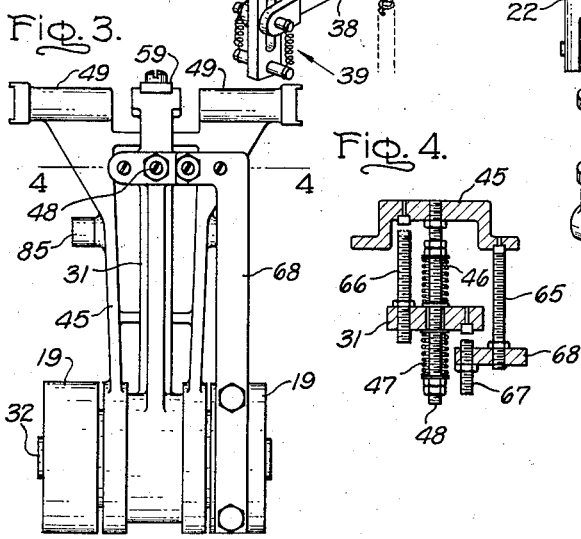
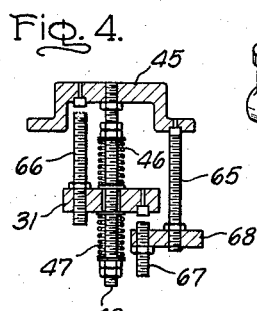
Inventors:
Lee E. Dilts,
John H. Hollopetre,
by *Otto Tichy*
Their Attorney.

United States Patent Office 2,845,200
Patented July 29, 1958

2,845,200

WIRE FEEDING APPARATUS

Lee E. Dilts, Cleveland, and John H. Hollopetre, Mayfield Heights, Ohio, assignors to General Electric Company, a corporation of New York Application September 10, 1956, Serial No. 608,976

2 Claims. (Cl. 221—210)

Our invention relates to apparatus for feeding lengths of wire and more particularly to apparatus for feeding lengths of wire to a machine in a definite timed relationship. Still more particularly, the invention relates to apparatus for feeding lead-in wires to a machine for making stems for electric lamps and similar devices. Such lead-in wires are each usually composed of three lengths of wire welded together in end-to-end relationship to form composite wire lengths referred to in the art as "welds."

It is a principal object of the present invention to provide improved wire feeding apparatus which will operate reliably at a substantially higher rate of speed than prior art apparatus to thereby permit an increase in the operating speed of the stem making machine.

A typical weld or lead-in wire feeder widely used in the art is illustrated in Patent 2,042,520 to J. Flaws, Jr., et al., wherein a quantity of the wires is stored in a hopper and the wires are individually fed therefrom to the heads of a stem machine by mechanism comprising a transfer member which selects one wire from the hopper, carries it outwardly away therefrom to a delivery position where the wire is released to fall in an inclined channel surface to a funnel member, thence downwardly through the funnel and through a vertically disposed movable shuttle or guide tube and to a head of the stem machine. The guide tube is mounted to reciprocate vertically to clear the stem head for indexing purposes. The movements of the guide tube and transfer member are effected by a cam in synchronism with the indexing of the turret carrying the stem heads. The speed of operation is inherently limited by the time required, upon raising of the guide tube, to move the transfer member to pick position and back to delivery position, and for the wire to slide down the channel, funnel and guide tube.

In accordance with one aspect of the present invention the speed of operation of the feeder is materially increased by an improved arrangement including operating means for the transfer member independent from the operating means for the shuttle or guide tube, thereby making it possible to initiate movement of the transfer member to pickup position immediately upon release of a wire at the delivery position whereas in the previous arrangement this could not be done until the wire had been received in the head of the stem machine and the guide tube raised. The present invention also includes certain other improvements in the construction and arrangement of various parts of the apparatus, including the transfer member, as will be apparent from the following detailed description of species thereof and from the drawings.

In the drawings,

Figs. 1 and 2 are side views of wire feeder apparatus comprising our invention with the parts shown at different periods in the operating cycle;

Fig. 3 is a fragmentary plan view of the transfer member;

Fig. 4 is a section of a fragment of the transfer member;

Fig. 5 is a front view, partly in section, showing the wire gripping ends or pickup tips of the transfer member and the associated supply hoppers;

Fig. 6 is a plan view of a funnel member and associated pickup tip of the transfer member;

Fig. 7 is an enlarged front view of the wire gripping jaws of the transfer member;

Fig. 8 is a perspective view of the operating cam members; and

Fig. 9 is a view similar to Fig. 5 of a modified form of transfer member.

In accordance with standard practice, the wire feeding apparatus comprises two hoppers 1 (Figs. 1, 2 and 5) each of which holds a supply of wires 2 which are to be fed at successive stations into a flare or stem tube 3 and into pockets 4 and 5 of a head comprising also flare holder jaws 6 and mounted at the periphery of a suitable carrier 7 which may be a rotatable turret or a conveyer having a plurality of such heads at equally spaced intervals thereon and which is adapted to be periodically indexed from station to station. The stem machine may be of any conventional type such as that shown, for example, in Patent 1,655,141 to Fagan, et al. By means of duplicate mechanisms two wires (one from each hopper) are simultaneously fed to each of two heads at adjacent stations.

Each of the hoppers 1 is mounted on a bracket 8 which is pivotally mounted on a shaft 9 carried by a hollow column 10 which is secured by bolts 11 to a hollow post 12 extending upwardly from a table (not shown) supported from the bed of the machine carrying the turret 7. Each hopper is held in inoperative position by engagement of a latch 13 on arm 14 on bracket 8 with a key member 15 (Fig. 1). The key 15 is carried by a tubular rod 16 which is secured to a bracket 17 pivoted on a pin 18 in an angular bracket-shaped extension 19 of column 10, and the rod 16 is held in a substantially vertical position by a stop screw 20 (Fig. 2) in an arm 21 extending from column 10.

When a flare or stem tube 3 is present in a head, at the beginning of the indexing movement of the head, the flare will strike the angular outer end of a rod 25 extending laterally from the rod 16 toward the preceding station, thereby causing the rod 16 to be pivoted about pin 18, as shown in Fig. 2, and releasing the latch 13 so that the hopper 1 is rotated a few degrees about shaft 9 by the spring 26. The amount of rotation is limited by a stop pin 27 in column 10 which is engaged by a screw 28 in a bracket-shaped extension 29 of the bracket 8. The opposing screw 23 serves to prevent unlimited rotation of the bracket 8 and hopper 1 about the shaft 9 in case the spring 26 should become broken. In the position of the hopper 1 shown in Fig. 2, the wires 2 are brought into operative relation to the pickup tip portions of a transfer member 30.

The transfer member 30 comprises an arm 31 which is keyed to a shaft 32 which is journaled in bearings in the bracket-shaped extension 19 of column 10. The shaft 32 is rotated by a linkage system including the arm 33, link 34, bell crank lever 35 (pivoted on pin 36 in column 10) and connecting rod 37 which is actuated by a lever 38 (Fig. 8) through a resilient lost motion connection 39 from a cam 40 on the shaft 41. The transfer member 30 further comprises a bracket arm 45 which is free to rotate about the shaft 32 and is resiliently connected to arm 31 by a pair of springs 46 and 47 (Figs. 1 and 4) carried on a stud 48 which extends through a hole in arm 31 and is secured at one end to arm 45. The bracket arm 45 has a pair of laterally extending sleeve portions 49 (Figs. 3 and 5) at its outer end which carry pickup tip portions each comprising a stationary jaw 50 secured to the sleeve 49 and a cooperating movable jaw 51. The movable jaw 51 is a thin member which moves in a slot in the stationary jaw 50.

The jaw 50 (Fig. 7) has a pair of notches 55 in the bottom thereof and each of a size to receive only one of the wires 2 in the hopper 1. The movable jaw 51 has a claw portion 56 arranged to slide across the face of jaw 50 to clamp a wire present in one of the notches 55. If a wire is present in the first notch 55 traversed by the claw 56 it will be gripped; if no wire is present in the first notch the claw will grip a wire present in the second notch. The two notches 55 thereby provide a safety factor to assure gripping of a wire upon each operation of the jaws 50—51. Each movable jaw 51 is carried by a rod 57 (Fig. 5) slidably mounted in sleeve 49 and carrying at its end a roller 58 engageable with a butterfly cam 59 carried by the arm 31. The rollers 58 are held against the cam 59 by a spring 60 interconnecting the rods 57.

The transfer member 30 is moved from the delivery position shown in Fig. 1 to the pickup position shown in Fig. 2 by rotation of the shaft 32 as effected by the cam 40. The rotation of shaft 32 causes the arm 31 to be rotated counterclockwise (Figs. 1 and 2), and the arm 45 is correspondingly rotated by the arm 31 by virtue of the springs 46—47 to the position shown in Fig. 2 where it is stopped by engagement of a stud or boss 61 on arm 45 with a stop screw 62 mounted on an arm 63 attached to the column 10. The arm 31 continues to rotate a slight amount, while spring 46 is compressed, to cause the diverging surfaces 64 of cam 59 (Fig. 5) to be driven between the rollers 58 to push the jaws 51 outwardly to their open position shown in Fig. 7 and to expose the notches 55 of jaws 50 to receive the wires 2. The shaft 32 is then rotated in the reverse clockwise direction by the cam 40 whereupon the arm 31 initially rotates a slight amount while the arm 45 remains down due to pressure of the spring 46 to cause the cam 59 to be drawn back to the position shown in Fig. 5 whereby the rods 57 are moved toward each other to cause the moveable jaws 51 to move toward a closed position and grip a wire in one of the slots 55 of each jaw 50. Both arms 31 and 45 then move together to the delivery position shown in Fig. 1 where movement of arm 45 is arrested by engagement with a stud 65 on the end of a stop arm 68 mounted on the outer end of the extension 19 of column 10. The arm 31 continues to rotate a slight additional amount whereby the spring 47 is compressed and the surfaces 69 of cam 59 are brought between the rollers 58 to cause the moveable jaws 51 to move outwardly and release the wires 2.

Excessive overtravel of the arm 31 at each end of its stroke may be prevented by providing a stop stud 66 (Fig. 4) on the arm 31 engageable with the arm 45 and a stop stud 67 on fixed arm 68 and engageable by the arm 31. At the pick-up position, the stop 66 prevents outward movement of the claw 56 on jaw 51 beyond the position shown in Fig. 6 so as to prevent entrance of a wire 2 into the space between said claw 56 and the outer side of the fixed jaw 50. Moreover, at both the pickup and delivery positions, the stop studs 66 and 67 prevent movement of jaw 51 so far outward as to be outside the slot in jaw 50 in which said jaw 51 is contained.

In order to assure release of the wire 2 from the jaws 50, 51, we provide a stripper or stop member in the form of a release wire 66 which is secured to each funnel 70 and extends upwardly beyond the jaws 50, 51 and thence laterally over the funnel and across the path of the wire 2 held by said jaws. As stated previously, the wire 2 is actually a composite of three wires welded together, and such wires have weld knots at the joints. Occasionally, upon opening of the jaws 50, 51, one of the wires 2 may slide down to a position where the weld knot catches on the jaws and prevents proper release of the wire. Such action is prevented by the release wire 66 which will tip the wire 2 out of the jaws.

Upon release of a wire 2 from each pair of jaws 50—51, it drops downward into a vertical funnel 70 mounted on the extension 19 of column 10, the said funnel being slotted at its upper end to permit passage of the wire thereinto. The wire drops through the funnel 70 and to a shuttle or guide tube 71 having a constricted lower end 72 through which the wire is guided into one of the pockets 4 or 5. The arrangement of funnel 70 and guide tube 71 is duplicated on the side of the apparatus opposite that viewed in Figs. 1 and 2. The guide tube 71 seen in Figs. 1 and 2 directs a wire 2 into the pocket 5 while its counterpart directs a wire into the pocket 4 in a head at the preceding station.

Each guide tube 71 is supported in a bracket 73 which is pivotally mounted on a pin 74 in a common bracket 82 extending from rod 22 through a slot in column 10. The guide tubes are arranged to be vertically reciprocated so as to be withdrawn from the head 4, 5, 6 to the position shown in Fig. 2 to permit the head to be indexed. The reciprocation is effected by a cam 75 (Fig. 8) which acts through a bell crank lever 76 and link 77 connected to the connecting rod 22. In its raised position the guide tube 71 is maintained in a substantially vertical position by engagement of a roller 78 on the bracket 73 with a rod 79 extending vertically downward from the extension 19 of column 10; the roller 78 being held against the rod 79 by a spring 80 extending between pins on the brackets 73 and 82.

As shown in Fig. 1, when the guide tube 71 approaches its lowermost position it is tilted clockwise by engagement of the roller 78 with an inclined cam surface 81 on the rod 79 to thereby bring the lower end 72 of the guide tube into registry with the pocket 5. The corresponding duplicate guide tube (not shown) is similar in all respects to that seen in Figs. 1 and 2 except that the roller 78 is at the bottom of the bracket 73 and the spring 80 is arranged above the pivot pin 74 to cause that guide tube to tilt counterclockwise and bring its lower end into registry with the pocket 4 of a head in the preceding station.

The hoppers 1 are each returned to the inoperative position shown in Fig. 2 by engagement of a roller 85 on the arm 45 of transfer member 30 with a cam surface 86 on the hopper and are locked in that position by the latch 13. If there should be no flare tube 3 present in a head 4, 5, 6, the hopper will not be moved upward to operative position and no wire will be fed therefrom.

The cam shaft 41 is driven at the same speed as another shaft carrying the turret indexing cam which is not shown but which may be of the type shown in Patent 1,742,153, to Stiles et al., and Patent 2,449,648, to Flaws.

In the operation of the apparatus, as soon as a head 4, 5, 6 has begun its indexing movement from the station occupied by the funnel 70 and guide tube 71, the flare tube 3 in that head strikes the angular outer end of the rod 25 to thereby tilt the rod 16 and cause the key 15 to release the latch 13 whereby the bracket 8 is rotated a few degrees to raise the hopper 1 into operative relation to the transfer member 30. However, before the indexing movement starts, the transfer member 30 has rotated from its upright delivery position shown in Fig. 1 to its inclined pickup position shown in Fig. 2 with the movable pickup jaws 51 moved to their open position by cam surface 64, as shown in Fig. 7, so that the stationary jaws 50 have their notches 55 exposed to receive wires 2 thrust therein by the upward movement of the hoppers 1. Thereupon the movable jaws 51 are moved to closed position when the arm 31 of transfer member 30 begins its return movement while arm 45 is temporarily held down by the spring 46, after which the arm 45 moves together with the arm 31 to the upright position shown in Fig. 1 where the wires 2 are released when the arm 45 engages the stop arm 68 and the arm 31 travels slightly farther to cause the surfaces 69 of cam 59 to separate the rollers 58 on rods 57 carrying the movable pickup jaws 51.

At about the time that the wire 2 is released by the transfer member 30, the shuttle or guide tube 71 has moved downward into registry with the head 4, 5, 6, as shown in Fig. 1 to receive the wire from the funnel 70 and guide it into the pocket 5. It is only necessary that the guide tube 71 be properly in registry with the pocket 5 by the time the wire reaches the bottom of the guide tube and, since a certain short interval of time is required for the wire to fall through the funnel 70 and guide tube 71, the wire may be released from the transfer arm 30 before the guide tube reaches its lowermost position. The guide tube 71 is moved upward just before the index of head 4, 5, 6 to provide clearance for the head during index.

The proper synchronization of movement of the guide tube 71 with respect to that of the transfer member 30, and of both those members with the indexing movements of the heads 4, 5, 6, is made possible by the provision of the separate cams 40 and 75 (Fig. 8) for actuating the transfer member and guide tube respectively. As soon as a wire is released by the transfer member 30, that member is free to immediately rotate back to the hopper 1 to pick up another wire whereas in the prior art arrangement that could not be done until the wire had arrived in the pocket 5 and the guide tube 71 was raised. The operating speed of the device shown herein is further increased by the arrangement of the transfer member 30 which rotates through an angle of only about 45° to a vertical position where the wire is released so that less time is consumed for the wire to reach the pocket 5 than when the wire is released at an angle to the vertical and is required to slide to a vertical position and then into the pocket as in the prior art arrangement. It thus becomes possible to materially increase the indexing speed of the turret 7 without sacrificing reliability of operation of the wire-feeding apparatus.

In Fig. 9 we have illustrated a modified form of transfer mechanism 30' employing pickup tips 90 of a vacuum type. (Corresponding parts in Fig. 9 are numbered the same as those in Fig. 5 with the addition of a prime to the numerals.) The tips 90 are mounted adjacent the ends of the sleeves 49' on the arm 45' and are each designed to hold a single wire 2'. The vacuum supply to each tip 90 is through a conduit or hose 91 and is controlled in any suitable manner. When desired, the vacuum is supplied directly from conduits 91 to the tips 90 and is applied continuously, the wires 2' being stripped from the tips 90 at the delivery position of the arm 45' by the wire stripper member 66 mounted on the funnel 70 and extending across the path of movement of the wire 2' carried in the tip 90; alternately, the vacuum may be turned on during movement of the arm 45' toward pickup position and turned off just before the arm reaches its delivery position by a solenoid operated valve connected to the conduits 91 and actuated by a microswitch which is in turn actuated by part of the operating linkage such as the lever 35.

As herein illustrated the vacuum supply to the tips 90 is controlled by valve slide rod members 92 mounted in the sleeves 49' and having undercut portions 93 affording communication between the tips 90 and conduits 91 through passages 94 and 95. The undercut portion 93 of each rod 92 is normally held in alignment with the passages 94 and 95 by engagement of a ball member 96 carried in a pocket at the inner end of rod 92 with a cam member 59' carried by an arm corresponding to arm 31 (Fig. 1), the ball members 96 being urged against the cam 59' by springs 97. The vacuum is shut off at the delivery position of the arm 45' to release the wire when movement of said arm is arrested by the stop stud 65 on arm 68 (Fig. 1) and continued movement of arm 31 carries the inclined surfaces 98 of the cam 59' between the ball members 96 to cause the valve rods 92 to move outward and the undercut portions 93 to move out of alignment with the passages 94 and 95. The timing of operation of the vacuum pickup transfer 30' may be the same as that of mechanical pickup transfer 30 described above.

What we claim as new and desire to secure by Letters Patent of the United States is:

1. In combination with a carrier having a plurality of heads thereon and means for indexing the carrier to carry the heads intermittently to a plurality of stations, a wire feeding apparatus at one of said stations comprising a hopper adapted to hold a quantity of wires at an angle to the vertical, a transfer member comprising a pick-up tip portion adapted to grip a single wire, means mounting said member for movement of the tip portion in a vertical plane from a pick-up position at said hopper to a delivery position whereat the wire is held in a substantially vertical position above the head at said station, means to effect gripping of a wire by said tip portion at the pick-up position and release of the wire at said delivery position, a vertically arranged funnel mounted to receive the wire released by said tip portion, a movable guide tube below and in alignment with said funnel to receive the wire therefrom, means mounting said guide tube for vertical reciprocation to carry the lower end thereof alternately downward into registry with the head at said station and upward out of the path of the heads during the indexing movement thereof, operating means synchronized with the carrier indexing means to carry said guide tube downward upon entry of a head into said one station and upward prior to indexing of the head away from said station, and independent operating means synchronized with the carrier indexing means to initiate movement of said transfer member to pick-up position prior to upward movement of said guide tube whereby to minimize the time of delivery of a wire from said hopper into the head at said station.

2. In apparatus of the class described, a wire transfer mechanism comprising first and second arm members mounted for rotation in a vertical plane on a horizontal shaft, the first arm member being fixed to said shaft and the second arm member being mounted for rotation about said shaft, cooperating fixed and movable pick-up jaws mounted on the free end of said second arm, means for actuating said movable jaw including a cam member carried by said first arm member, means for rotating said shaft to oscillate said first arm member between an upright delivery position and an inclined pick-up position, means resiliently interconnecting said first and second arm members to cause said second arm member to rotate with said first arm member, and stop means arranged to arrest movement of said second arm member just prior to the time the first arm member reaches each of its respective pick-up and delivery positions whereby the overtravel of said first arm causes said cam member to actuate said movable jaw first to an open position and then to a closed position relative to said fixed jaw at each of said pick-up and delivery positions.

References Cited in the file of this patent

UNITED STATES PATENTS 2,042,520     Flaws et al.             June 2, 1936